United States Patent
Kanazawa et al.

(10) Patent No.: US 9,590,553 B2
(45) Date of Patent: Mar. 7, 2017

(54) POWER CONVERSION APPARATUS AND ELECTRIC POWER STEERING DEVICE

(71) Applicant: Hitachi Automotive Systems, Ltd., Hitachinaka-shi, Ibaraki (JP)

(72) Inventors: Takuro Kanazawa, Tokyo (JP); Haruaki Motoda, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/792,815

(22) Filed: Jul. 7, 2015

(65) Prior Publication Data

US 2016/0072423 A1    Mar. 10, 2016

(30) Foreign Application Priority Data

Sep. 9, 2014    (JP) .................................. 2014-182854

(51) Int. Cl.
| | |
|---|---|
| *H02P 27/06* | (2006.01) |
| *B62D 5/04* | (2006.01) |
| *H02K 11/00* | (2016.01) |

(52) U.S. Cl.
CPC ............... *H02P 27/06* (2013.01); *B62D 5/04* (2013.01); *B62D 5/0406* (2013.01); *H02K 11/0073* (2013.01); *H02K 11/33* (2016.01); *H02K 2213/06* (2013.01)

(58) Field of Classification Search
CPC .................................. H02P 27/06; H02K 1/00
USPC ........ 318/400.26, 400.01, 700; 180/444, 443
See application file for complete search history.

(56) References Cited

U.S. PATENT DOCUMENTS

| | | | | |
|---|---|---|---|---|
| 7,710,723 | B2 * | 5/2010 | Korich | H05K 7/20927 165/104.33 |
| 2006/0044762 | A1 * | 3/2006 | Kikuchi | H01L 25/162 361/704 |
| 2008/0130223 | A1 * | 6/2008 | Nakamura | H02M 7/003 361/689 |
| 2011/0285225 | A1 | 11/2011 | Matsuda et al. | |
| 2011/0286185 | A1 | 11/2011 | Abe et al. | |

FOREIGN PATENT DOCUMENTS

| | | |
|---|---|---|
| JP | 2011-250488 A | 12/2011 |
| JP | 2011-250489 A | 12/2011 |

* cited by examiner

*Primary Examiner* — Kawing Chan
(74) *Attorney, Agent, or Firm* — Crowell & Moring LLP

(57) ABSTRACT

Disclosed is a power conversion apparatus that improves the reliability of a redundant system therefor. The power conversion apparatus includes a motor having a cylindrical motor case, a multi-phase stator, and a rotor, a power conversion section that switches the supply of electrical power to the motor, a control circuit board that controls the power conversion section, and a cover made of metal on which the power conversion section and the control circuit board are mounted. The power conversion section includes a first power conversion section and a second power conversion section. The cover includes a protrusion that protrudes toward the motor from a surface substantially parallel to the radial direction of the motor. The protrusion is formed in such a manner as to separate the first and second power conversion sections from each other.

12 Claims, 7 Drawing Sheets

POWER CONVERSION APPARATUS AND ELECTRIC POWER STEERING DEVICE

CLAIM OF PRIORITY

The present application claims priority from Japanese Patent application serial No. 2014-182854, filed on Sep. 9, 2014, the content of which is hereby incorporated by reference into this application.

FIELD OF THE INVENTION

The present invention relates to a power conversion apparatus that converts electrical power from DC power to AC power or from AC power to DC power. More specifically, the present invention relates to a method of implementing a redundant power conversion apparatus for use in a mechatronically-integrated system.

BACKGROUND OF THE INVENTION

Conventionally known is a mechatronically-integrated power conversion apparatus in which housings for a motor and a power conversion apparatus are directly connected or the motor and the power conversion apparatus are disposed in the same housing. It is strongly demanded that such a power conversion apparatus be reduced in size and weight due to installation space restrictions. According to an invention described, for instance, in Japanese Unexamined Patent Application Publication No. 2011-250489, a heat sink, a power module, a control wiring section, a power wiring section, a control connector, and a power connector are disposed in the axial direction of a motor to reduce the axial physical size of a drive unit.

SUMMARY OF THE INVENTION

Meanwhile, a redundant power conversion apparatus, which continuously supplies electrical power from the power conversion apparatus to a motor to incessantly drive the motor even if a primary failure occurs in a part of the power conversion apparatus, needs to be configured so as to prevent a secondary failure from being caused by the primary failure. Further, when an additional member is disposed to prevent a circuit from being affected by the breakage of a part of the power conversion apparatus, for example, the breakage of a semiconductor device in a main circuit, the number of parts is increased to make it difficult to reduce the size of the power conversion apparatus.

The present invention has been made in view of the above circumstances and improves the reliability of a redundant system for a power conversion apparatus.

According to an aspect of the present invention, there is provided a power conversion apparatus including a motor, a power conversion section, a control circuit board, and a cover. The motor includes a cylindrical motor case, a multiphase stator disposed in the motor case, and a rotor disposed inside the stator. The power conversion section switches the supply of electrical power to the motor. The control circuit board controls the power conversion section. The cover is made of metal on which the power conversion section and the control circuit board are mounted. The power conversion section includes a first power conversion section and a second power conversion section. The cover includes a protrusion that protrudes toward the motor from a surface substantially parallel to the radial direction of the motor. The protrusion is formed in such a manner as to separate the first and second power conversion sections from each other.

Even when a failure occurs in either one of the first and second power conversion sections, which are disposed on either side of the protrusion, the power conversion apparatus according to an aspect of the present invention inhibits the failure from affecting the other power conversion section. This makes it possible to increase the reliability of the power conversion apparatus.

DETAILED DESCRIPTION OF THE PREFERRED EMBODIMENTS

Embodiments of a power conversion apparatus according to the present invention will now be described with reference to the accompanying drawings. Identical elements in the drawings are designated by the same reference numerals and will not be redundantly described.

First Embodiment

A first embodiment of the present invention will be described with reference to a drive unit 100 that includes a power conversion apparatus 300 and a motor 200. The power conversion apparatus 300 converts electrical power. The motor converts electrical energy to mechanical energy.

Figure 1:
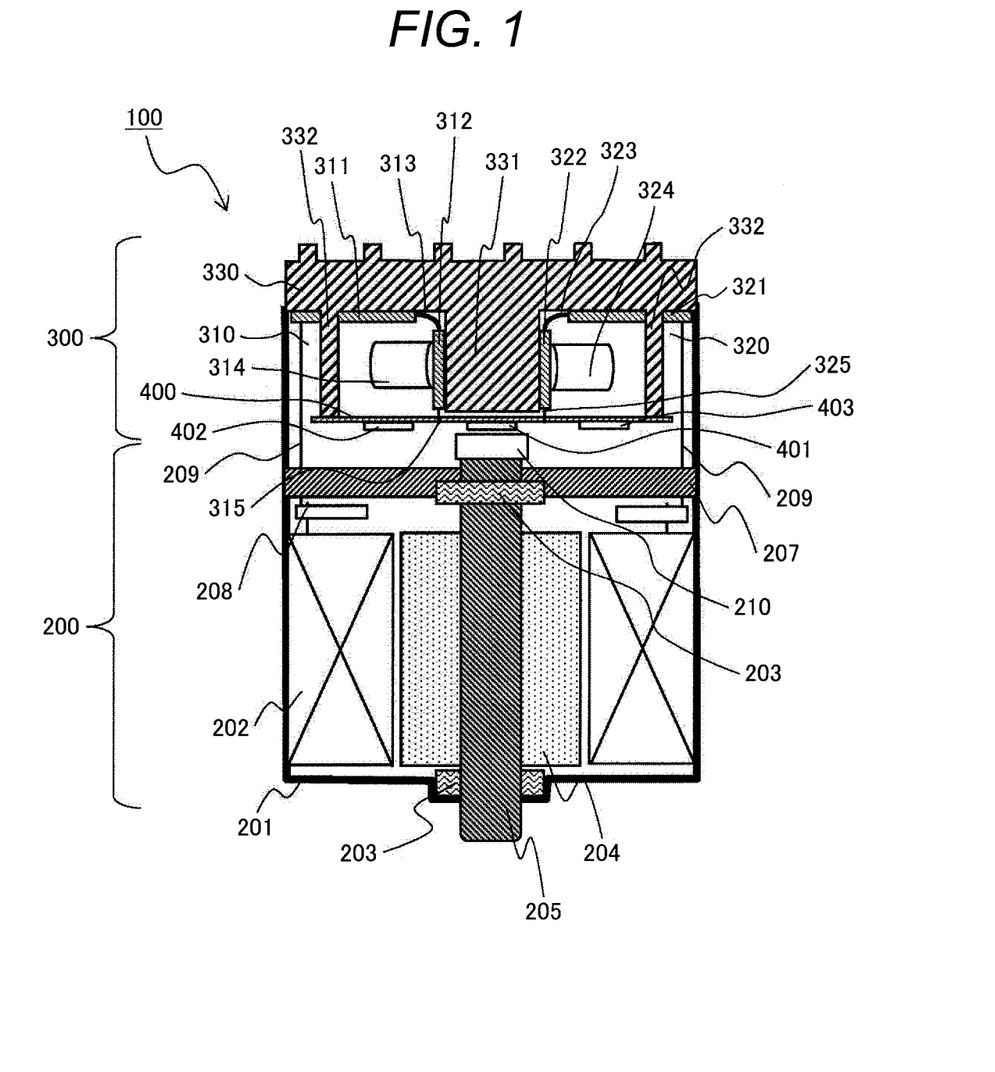
FIG. 1 is a diagram illustrating a configuration of a drive unit according to a first embodiment of the present invention.

FIG. 1 is a diagram illustrating an exemplary configuration of the drive unit 100 according to the first embodiment by presenting an axial cross-sectional view of the motor 200. The drive unit 100 includes the motor 200 and the power conversion apparatus 300. The motor 200 includes a stator 202 and a rotor 204. A winding is wound around the stator 202. The power conversion apparatus 300 includes a circuit that supplies desired electrical power to the motor 200.

The stator 202 of the motor 200 is structured so that a stator winding is wound around an electromagnetic steel plate. The stator 202 is circularly disposed inside a cylindrical motor metal housing 201. The stator 202 is secured, for instance, by pressure fitting or by shrink fitting. A space for securing a bearing 203 is provided on the side opposite to an opening in the motor metal housing 201 (provided on the lower side in the figure). The bearing 203 is pressure fit into the space.

A metal cover 207 is installed over the opening in the motor metal housing 201 to secure another bearing 203. The bearing 203 is pressure fit into the metal cover 207. The metal cover 207 is screwed down, pressure fit, or otherwise secured to the motor metal housing 201. Although not shown, the motor metal housing 201 is provided with a spigot structure for connecting to the metal cover 207.

The stator winding for the stator 202 includes three-phase windings, namely, U-, V-, and W-phase windings. A terminal busbar 208, which is molded with insulating resin, electrically connects the wirings for the individual stator windings. Either a Y-connection method or a delta-connection method may be used for the wiring connection of the stator windings. Further, a total of six metal wires, namely, two metal wires for each of the U-, V-, and W-phases, are axially extended from the terminal busbar 208 and routed through a hole in the metal cover 207.

The rotor 204 includes a shaft 205 and a permanent magnet. The permanent magnet is secured to the outer circumference of a rotary shaft. The rotor 204 can be rotated by the bearing 203 and a rotating magnetic field that is generated when a current flows to the stator winding. The permanent magnet may be made, for instance, of neodymium or ferrite. Further, a position detection magnet 210 is connected to an end of the shaft 205 that is positioned toward the power conversion apparatus 300.

The power conversion apparatus 300 includes power conversion sections 310, 320, a control circuit board 400, and a cover 330.

The cover 330 is formed of aluminum or other metal. The cover 330 includes a protrusion 331 that protrudes toward the axial direction of the motor 200 from a surface substantially parallel to the radial direction of the motor 200. The cover 330 includes a cooling fin. The cooling fin is disposed opposite to the side on which protrusion 331 is formed. Further, a metal column 332 is formed on the cover 330. The metal column 332 protrudes in the same direction as the protrusion 331. The control circuit board 400 is secured to the leading end of the metal column 332 as described later. The power conversion apparatus 300, which includes the power conversion sections 310, 320 and the control circuit board 400, is screwed down, pressure fit, or otherwise secured to the motor metal housing 201.

The protrusion 331 on the cover 330 is formed in such a manner as to partition a space into two with the protrusion 331 interposed therebetween. The power conversion section 310 is disposed on one side adjacent to the protrusion 331, and the power conversion section 320 is disposed on the other side adjacent to the protrusion 331. The power conversion sections 310, 320 are configured so that a lead frame and a metal-oxide-semiconductor field-effect transistor (MOSFET) are sealed with molding resin. The MOSFET is soldered or otherwise electrically connected to the lead frame, which is made of a metal.

As described above, the first power conversion section 310 is separated from the second power conversion section 320 by the protrusion 331. This makes it possible to inhibit, for example, impact and dust resulting from the breakage of a module of one power conversion section from affecting the other power conversion section. A possible breaking mode may be, for example, the rupture of a semiconductor device used in a power conversion section or the rupture of an electrolytic capacitor.

The cover 330 on which, for example, the MOSFET is mounted is formed of a metal member. Therefore, the cover 330 functions not only as an electromagnetic shielding member but also as a heat-dissipating member. The cover 330 made of metal may be formed integrally with the protrusion 331 to reduce the number of parts.

The power conversion section 310 includes a region 311 and another region 312. The region 311 is in contact with a surface of the cover 330 that is located on the side on which the protrusion 331 is formed. The surface of the cover 330 on which the region 311 is disposed in substantially parallel to the radial direction of the motor 200. The region 312 is in contact with a surface of the protrusion 331 that is substantially parallel to the axial direction of the motor 200. In other words, the surface of the cover 330 that is in contact with the region 311 is substantially orthogonal to the surface of the protrusion 331 that is in contact with the region 312. The power conversion section 310 is efficiently cooled as the two surfaces of the regions 311, 312 are cooled.

The regions 311, 312 of the power conversion section 310 are connected by a lead frame 313. The lead frame 313 has a portion that is exposed from molding resin without being covered by the molding resin. The lead frame 313 can be bent about a fulcrum formed by the exposed portion. As described above, the regions 311, 312 can be disposed orthogonally to each other simply by bending the lead frame 313.

The molding resin is formed so as to cover a surface of the lead frame positioned in the region 311 that is located toward the cover 330 and cover a surface of the lead frame positioned in the region 312 that is located toward the protrusion 331. The molding resin not only provides electrical insulation but also transfers heat. When, for instance, the molding resin has a thickness of 0.3 mm or less and a thermal conductivity of 3 W/(m·k) or higher, it makes it possible to efficiently dissipate heat generated from the power conversion section 310 to the cover 330 and provide adequate insulation.

The power conversion section 310 is screwed down or otherwise secured to the cover 330. For example, the regions 311, 312 of the power conversion section 310 are both screwed down to the cover 330.

The power conversion section 310 may be configured to assure good contact by inserting grease or other similar member between the molding resin and the cover 330. In such an instance, the grease may be applied to both the regions 311, 312 or applied to either one of them.

Although not shown in the figure, a switching section 10 and a motor semiconductor relay 11, which will be described later, are mounted in the region 311 of the power conversion section 310. An electrolytic capacitor 314, a choke coil 13, and a shunt resistor 14, which will be described later, are mounted in the region 312 of the power conversion section 310. The electrolytic capacitor 314 and the choke coil 13, which are large in volume, are disposed in a space between the protrusion 331 and the motor metal housing 201.

The shunt resistor 14 is soldered or otherwise connected together with the MOSFET. The electrolytic capacitor 314 and the choke coil 13 are welded or otherwise connected. The protrusion 311 facing the terminals of the electrolytic capacitor 314 and the choke coil 13 may be, for example, grooved or holed to provide adequate electrical insulation distance.

A signal wiring 315 is provided on the side toward the region 312 of the power conversion section 310. The signal wiring 315 is connected to a gate wiring of the MOSFET and to a voltage detection terminal of the shunt resistor. The signal wiring 315 may be formed of the same material as the lead frame. However, the signal wiring 315 is formed to be narrower than the width of a current input/output wiring for the switching section 10.

The motor 200 side of the region 312 of the power conversion section 310 and of a region 322 of the power conversion section 320 is provided with a plurality of signal wirings 315, 325, which are connected to the gate wiring of the MOSFET and to the voltage detection terminal of the shunt resistor. The signal wiring 315 and a signal wiring 325 are made of the same member as the lead frame and formed to be narrower than the width of the current input/output wiring for the switching section 10.

The power conversion section 320 has the same configuration as the above-described power conversion section 310, and will not be redundantly described. A region 321 of the power conversion section 320 corresponds to the region 311 of the power conversion section 310. The region 322 corresponds to the region 312. A lead frame 323 corresponds to the lead frame 313. An electrolytic capacitor 324 corresponds to the electrolytic capacitor 314. The signal wiring 325 corresponds to the signal wiring 315. The same holds true for the other elements not shown.

The control circuit board 400 is a multi-layer circuit board formed, for instance, of a glass epoxy substrate (FR4) and a metal wiring. The control circuit board 400 is shaped so that both of its ends are cut out to stay clear of an electrical wiring 209 protruding from the motor side. The control circuit board 400 has a hole that is positioned to face the metal column 332 of the cover 330. The control circuit board 400 is screwed down or otherwise secured to the metal column 332 of the cover 330. A through-hole is formed in the control board 400 and positioned near the protrusion 331 to establish an electrical connection to the signal wiring 315 of the power conversion section 310 and to the signal wiring 325 of the power conversion section 320.

A position sensor 401 for detecting the position of the motor is mounted substantially at the center of the control circuit board 400. The position detection magnet 210 is disposed opposite the position sensor 401 and at a predetermined distance to the position sensor 401. Further, control circuit parts common to the two power conversion sections are mounted opposite the protrusion 331. The control circuit parts include, for example, a later-described microcomputer 41.

Furthermore, a driver IC 402 and a driver IC 403 are mounted on the control circuit board 400. The driver IC 402 outputs a gate signal to the power conversion section 310. The driver IC 403 outputs a gate signal to the power conversion section 320. As viewed from the axial direction of the motor 200, the driver IC 402 is disposed on one side of the protrusion 331, and the driver IC 403 is disposed on the other side of the protrusion 331. Besides, a regulator section 44 and an amplifier section 45, which are not shown, are mounted on the control circuit board 400 and positioned in a region opposite the power conversion section 310. The regulator section 44 supplies stable electrical power. The amplifier section 45 detects a current.

Meanwhile, circuit parts for controlling the power conversion section 310 are mounted on a control circuit board portion that is positioned opposite the power conversion section 310 with the protrusion 331 interposed therebetween. The circuit parts include, for example, the driver IC 402, the regulator section 44, and the amplifier section 45. The driver IC 402 outputs a gate signal to the power conversion section 310. The regulator section 44 supplies stable electrical power. The amplifier section 45 detects a current. The configuration of a portion opposite the power conversion section 320 is the same as described above and will not be redundantly described.

Parts common to the two power conversion sections 310, 320 are disposed in a region opposite the protrusion 331. Parts respectively related to the power conversion sections are disposed in a region opposite the respective power conversion sections with the protrusion 331 interposed therebetween. Configuring the power conversion sections as described above makes it possible to inhibit a failure in either the power conversion section 310 or the power conversion section 320 from affecting the other power conversion section. This contributes to an increase in the reliability of the power conversion apparatus.

Further, the metal housing 201 for the motor 200 includes threaded portions for connecting to the cover 330 for the power conversion apparatus 300. The threaded portions are provided, for example, on the outside of a motor diameter of the motor metal housing 201, which is positioned on a lateral end of the power conversion apparatus 300. The figure shows that the motor metal housing 201 is structured to cover both the internal parts of the motor 200 and the power conversion apparatus 300. Alternatively, however, the power conversion apparatus 300 may be covered with a separate part.

Figure 2:
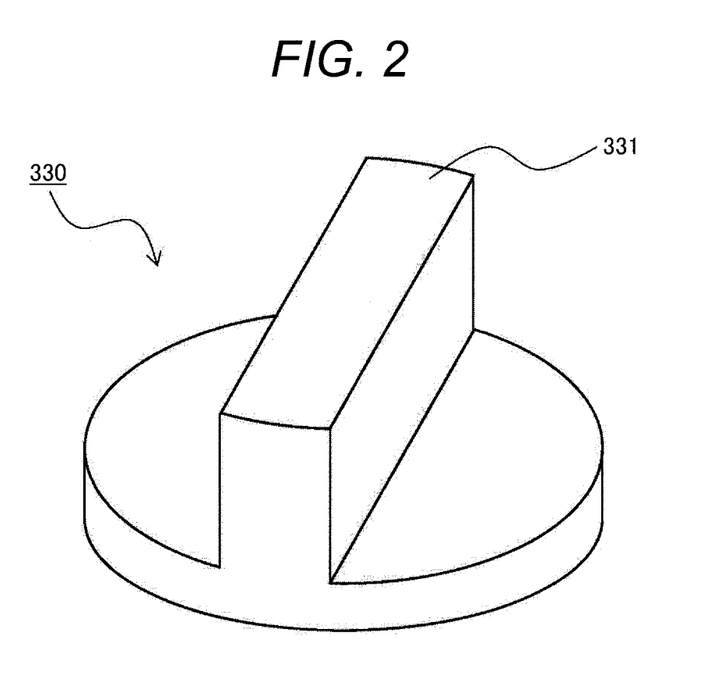
FIG. 2 is a schematic perspective view illustrating the shape of a cover.

FIG. 2 is a schematic perspective view illustrating the shape of the cover 330. FIG. 2 does not show the configuration, for example, of the metal column 332.

Figure 3:
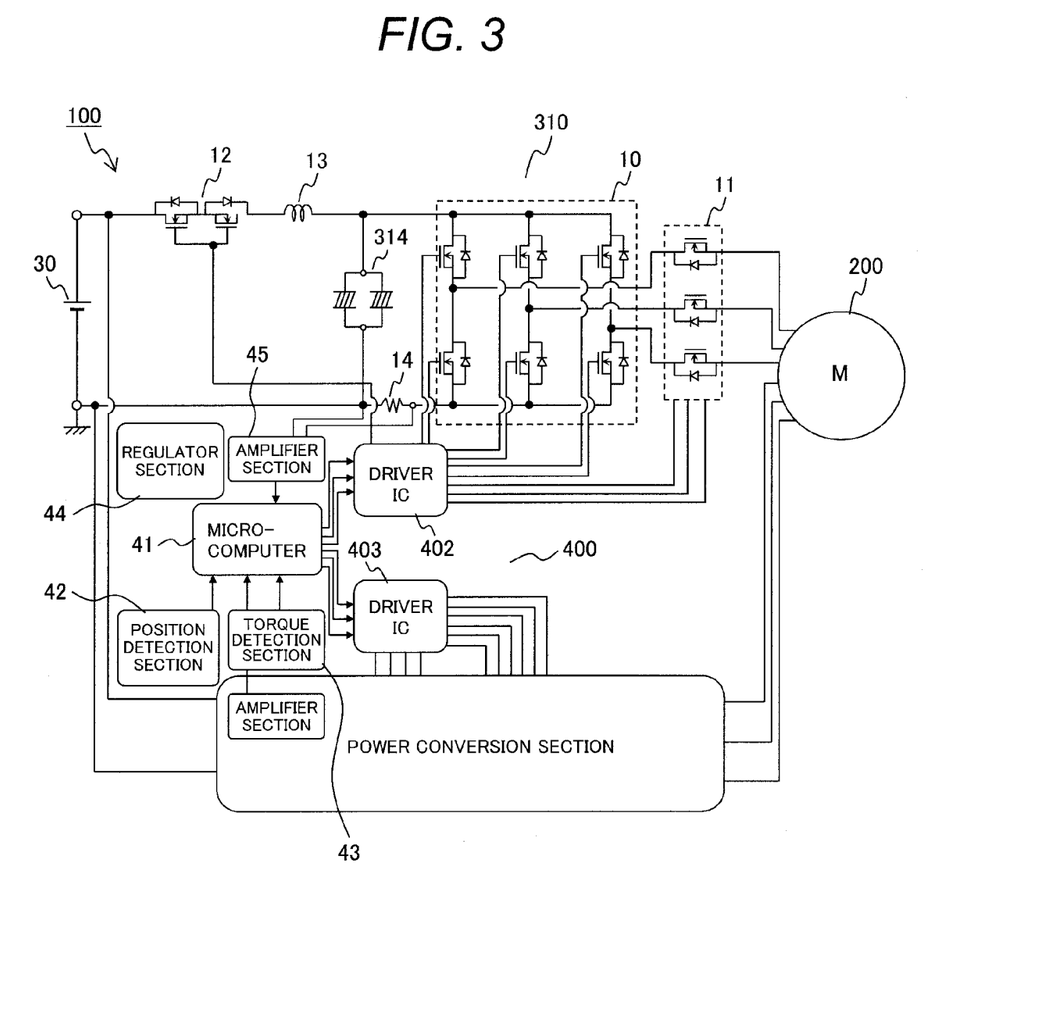
FIG. 3 is a circuit diagram illustrating the drive unit according to the first embodiment.

FIG. 3 shows a circuit configuration of the drive unit 100. As described earlier, the power conversion apparatus 300 includes the power conversion sections 310, 320 and the control circuit board 400. An input side of the power conversion apparatus 300 is connected to a power supply, for example, for a battery. An output side of the power conversion apparatus 300 is connected, for example, to a brushless three-phase motor. The power conversion section 320 has the same circuit configuration as the power conversion section 310.

The power conversion section 310 includes MOSFETs, which are semiconductor devices. The switching section 10 of the power conversion section 310 is formed of six MOSFETs. Each phase of the switching section 10 includes two MOSFETs, namely, high- and low-side MOSFETs. The power conversion section 310 converts DC power input from a power supply 30 to three-phase AC power by individually varying the gate potential of each MOSFET of the switching section 10.

The motor semiconductor relay 11 is disposed at a neutral point of each phase at which the source potential of the high-side MOSFET is equal to the drain potential of the low-side MOSFET. The motor semiconductor relay 11 is also formed of MOSFETs. The figure shows that the source electrode side of the MOSFETs is electrically connected to the winding of each phase of the motor.

The power conversion section 310 includes the electrolytic capacitor 314 and the choke coil 13. The electrolytic capacitor 314 and the choke coil 13 are disposed away from the switching section 10 and toward the power supply. The electrolytic capacitor 314 is disposed between the positive electrode wiring of the switching section 10 and the ground wiring thereof. The choke coil 13 is disposed away from the electrolytic capacitor 314 and toward the power supply. The choke coil 13 is disposed between the positive electrode wiring of the switching section 10 and the power supply. The electrolytic capacitor 314 is formed, for example, of a conductive polymer hybrid electrolytic capacitor. Further, the electrolytic capacitor 314 and the choke coil 13 form a filter circuit. The filter circuit prevents noise generated in the switching section 10 from affecting the outside. The filter circuit also inhibits extraneous noise from affecting the power conversion apparatus.

The power conversion section 310 includes the shunt resistor 14, which is disposed between the ground wiring of the electrolytic capacitor 314 and the ground wiring of the switching section 10. The shunt resistor 14 detects currents flowing to the U-, V-, and W-phases of the motor 200 by detecting a potential difference that arises when a current flows to the shut resistor 14.

The power conversion section 310 also includes a power supply semiconductor relay 12, which is disposed away from the choke coil 13 and toward the power supply. The power supply semiconductor relay 12 is formed of MOS-FETs, as is the case with the motor semiconductor relay 11. The power supply semiconductor relay 12 functions as a bidirectional relay when the source electrodes of the two MOSFETs are at the same potential.

A control section 400 includes driver ICs 402, 403, a microcomputer 41, a position detection section 42, a regulator section 44, and an amplifier section 45.

The regulator section 44 has a function of supplying stable electrical power, for example, to the microcomputer 41 and to the driver ICs 402, 403. The regulator section 44 is formed of a dedicated IC or a discrete part. The regulator section 44 has a circuit that acts, for example, as a switching regulator or a linear regulator.

The position detection section 42 includes, for example, a giant magnetoresistive effect (GMR) sensor and a hall IC. The position detection section 42 identifies the position of the rotor 204 by detecting the magnetic field of the position detection magnet 210, which is mounted on an end of the shaft 205. Position information about the motor rotor 204, which is detected by the position detection section 42, is transmitted to the microcomputer 41.

The amplifier section 45 amplifies a voltage detected by the shunt resistor 14 and transmits current value information to the microcomputer 41. The amplifier section 45 has a circuit that includes, for example, an operational amplifier and passive components such as a resistor and a capacitor.

The microcomputer 41 acquires position information about the motor 200 from the position detection section. The microcomputer 41 also acquires motor current information from the amplifier section 45. If necessary, the microcomputer 41 acquires torque information from a separately provided torque detection section 43. The microcomputer 41 controls the power conversion apparatus 300 by using the above items of information. More specifically, the microcomputer 41 generates and outputs control signals to the driver ICs 402, 403 in such a manner as to obtain a desired motor rotation speed and torque output.

An operation performed in the event of an abnormality (failure) will now be described. If, for instance, a MOSFET of the switching section 10 is short-circuited in either the power conversion section 310 or the power conversion section 320, the power conversion apparatus 300 detects such an abnormality and turns off the power supply semiconductor relay 12, the motor semiconductor relay 11, or both. The power supply semiconductor relay 12 prevents the flow of a short-circuit current from the power supply 30 to the switching section 10 or the motor 200. The motor semiconductor relay 11 prevents a normal power conversion section from being affected by a counter-electromotive force that is generated when the rotor 204 of the motor 200 rotates.

Figure 4:
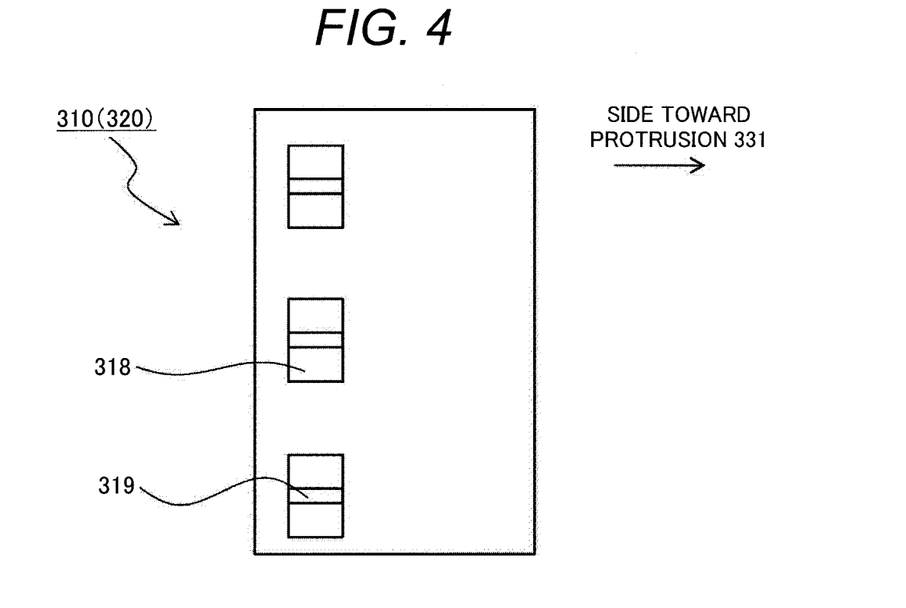
FIG. 4 shows an example of a motor joint of a power conversion section.

FIG. 4 shows how a motor output wiring 209 is connected in the region 311 of the power conversion section 310. FIG. 4 shows a view from the motor 200. The protrusion 331 is located on the right side of FIG. 4 when viewed from the motor 200. The power conversion section 320 has the same configuration as the power conversion section 310. The following description is given with reference to the power conversion section 310.

The power conversion section 310 includes an open section 318 and a terminal 319. The open section 318 and the terminal 319 are provided to establish an electrical connection to the motor output wiring 209. The open section 318 and the terminal 319 are provided for each of the U-, V-, and W-phases.

Figure 5:
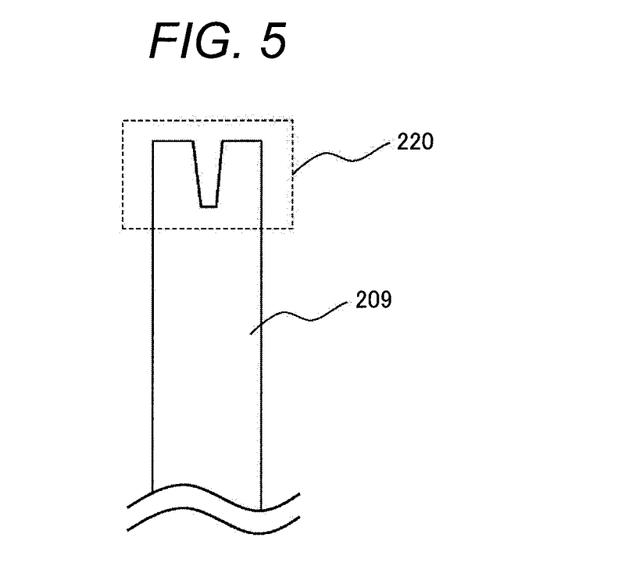
FIG. 5 shows an example of a motor wiring connection section.

FIG. 5 is an enlarged view of the leading end of the motor output wiring 209. The leading end of the motor output wiring 209 is shaped like a two-pronged fork 220. When the motor 200 is to be connected to the power conversion apparatus 300, the two-pronged fork 220 is disposed so that the terminal 319 is crimped into the valley of the two-pronged fork 220. When the terminal 319 is crimped into the valley of the two-pronged fork 220, the two-pronged fork 220 of the motor wiring 209 is electrically connected to the terminal 319 of the power conversion section 310.

The motor wiring connection structure shown in FIGS. 4 and 5 merely serves as an example. An alternative terminal structure may be employed as far as it remains in a good contact state and exhibits low contact electrical resistance when pressurized.

The power conversion apparatus according to the present embodiment, which is configured as described above, provides the following advantageous effects.

(1) The power conversion sections 310, 320 are disposed apart from each other with the protrusion 331 of the cover 330 made of metal interposed therebetween. Therefore, a power conversion section can be inhibited from being affected by the breakage of the other power conversion section. This makes it possible to provide a highly reliable power conversion apparatus.

(2) The power conversion sections are cooled by two cooling surfaces, namely, by a surface substantially parallel to the radial direction of the motor 200 and by a surface of the protrusion 331 that is substantially parallel to the axial direction of the motor 200. Thus, the heat generated by the power conversion sections can be effectively dissipated to the cover and to the outside. This contributes to reducing the size of the power conversion sections.

(3) The lead frame positioned between the two cooling surfaces for the power conversion sections is exposed from the resin and bent about a fulcrum formed by the exposed portion after molding. Thus, the cooling surfaces for the power conversion sections can be located 90 degrees away from each other. This makes it easy to manufacture a power conversion section having a plurality of cooling surfaces.

(4) The metal cover is integral with the protrusion. This makes it possible to reduce the number of parts by eliminating a heat sink, which was formerly a separately adopted member.

(5) The electrolytic capacitor and the choke coil, which are relatively large parts, are disposed in a space between the control circuit board and the cover. This makes it possible to further reduce the size of the power conversion apparatus.

(6) Control parts common to the two power conversion sections are positioned opposite the protrusion. Thus, the common control parts are inhibited from suffering a secondary failure due to the influence of a primary failure. This makes it possible to provide a power conversion apparatus having higher reliability.

(7) The power conversion sections are configured so that a female terminal is disposed on a cover surface parallel to the radial direction of the motor while a male terminal protrudes from the motor. Therefore, a process of closing the cover can be performed at the same time the motor is electrically connected to the power conversion apparatus. This reduces a production process.

Second Embodiment

Figure 6:
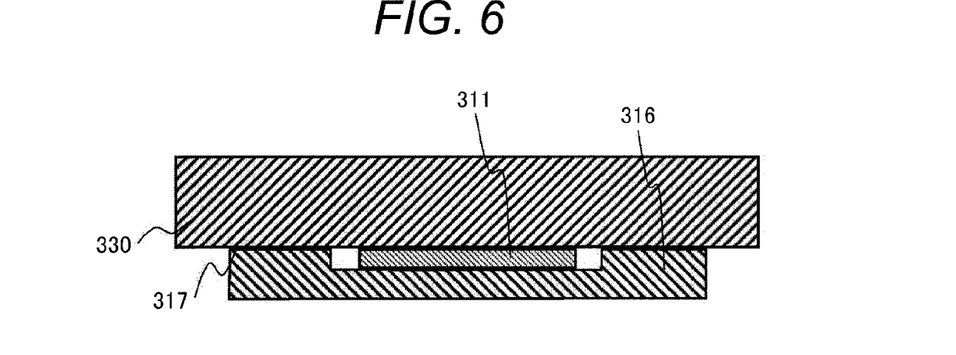
FIG. 6 shows an exemplary structure of the power conversion section in the drive unit according to a second embodiment of the present invention.

A second embodiment of the present invention will now be described with reference to FIG. 6. FIG. 6 shows an exemplary structure of a power conversion section in the power conversion apparatus according to a second embodiment of the present invention. Referring to FIG. 6, the region 311 of the power conversion section 310 is secured to the cover 330 with a metal plate 316. Portions having the same structure as those of the first embodiment will not be depicted in the figure or described.

In the present embodiment, the region 311 of the power conversion section 310 is configured so that the cover 330 is disposed toward one surface, and that the plate 316 is disposed toward the other surface. The switching section 10 and the motor semiconductor relay 11 are mounted in the region 311. The metal plate 316 is screwed down or otherwise secured to the cover 330 so as to come into contact with a surface 317 of the cover 330. The surface 317 is on the side on which the power conversion section 330 is mounted.

Although not shown in the figure, a wide plate-like wiring (for example, a clip) made, for instance, of copper is connected to the drain of the MOSFET in the power conversion section 310. Resin that covers the plate-like wiring has a width, for instance, of 0.3 mm and a thermal conductivity of 3 W/(m·k). Thus, the resin provides thermal conductivity and insulation.

As the above-described configuration is employed, the cooling surface of the region in which the switching section and the motor semiconductor relay are positioned is increased twofold. Further, a heat dissipation path from the metal plate to the cover is provided to further improve the heat dissipation performance of the power conversion section. As a result, the size of the power conversion section is further reduced. Furthermore, the power conversion section is secured with the plate-like member to uniform the pressure exerted between the power conversion section and the cover. This makes it possible to obtain an adequate heat dissipation area that exhibits low contact thermal resistance. Moreover, as the power conversion section is secured with the metal plate, the power conversion section need not be provided, for instance, with a hole for securing. Therefore, an adequate heat dissipation area can be obtained.

Third Embodiment

Figure 7:
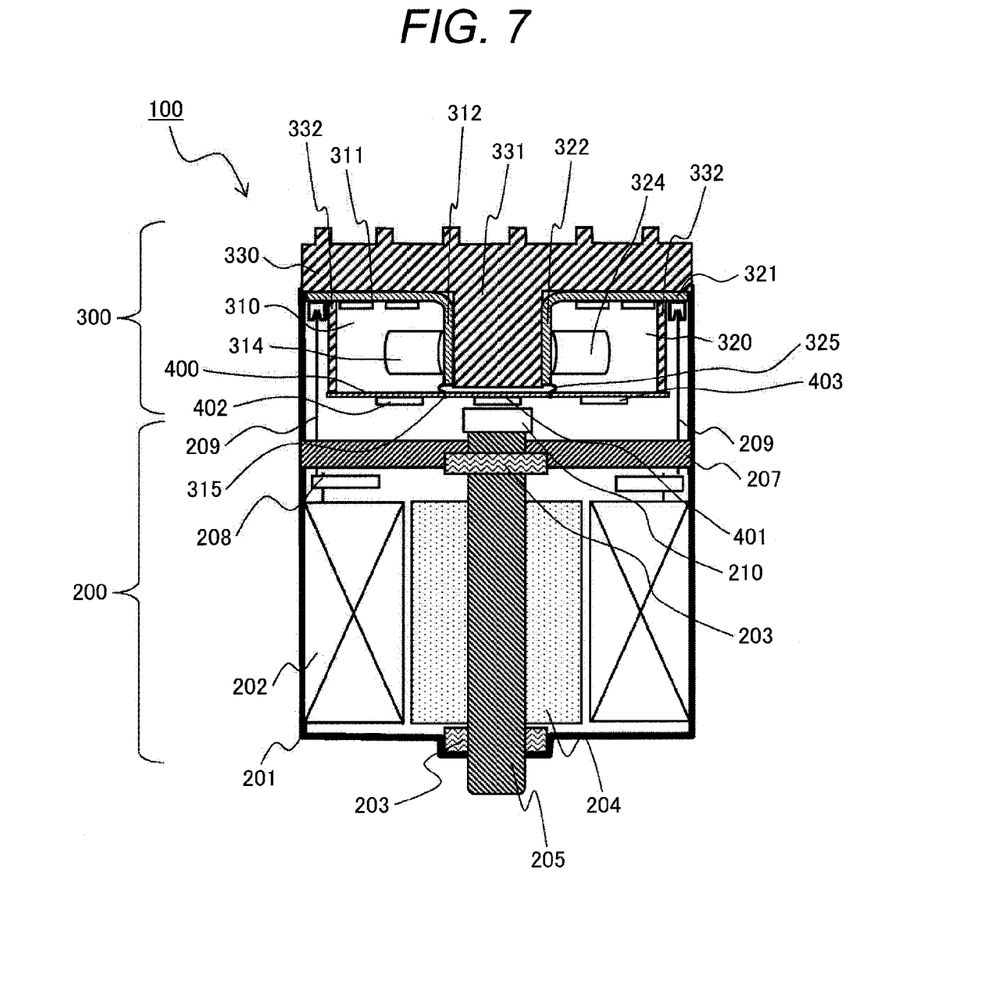
FIG. 7 is a diagram illustrating a configuration of the drive unit according to a third embodiment of the present invention.

A third embodiment of the present invention will now be described with reference to FIGS. 7 and 8. FIG. 7 illustrates the third embodiment by presenting a cross-sectional view taken along the radial direction of the motor as in FIG. 1. In the foregoing embodiments, a lead frame and a bare chip of MOSFET are used as the power conversion sections 310, 320. In the third embodiment, however, the power conversion sections 310, 320 are formed of an insulated metal circuit board on which a plurality of discrete MOSFETs are mounted.

Figure 8:
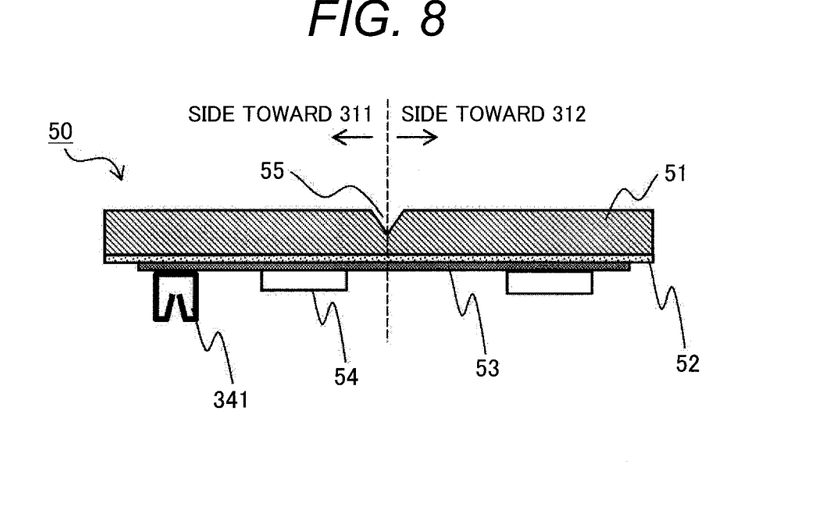
FIG. 8 is a diagram illustrating an exemplary configuration of an insulated metal circuit board according to the third embodiment.

FIG. 8 shows an insulated metal circuit board 50 on which MOSFETs 54 are mounted. The insulated metal circuit board 50 is formed of a metal base 51, an insulating layer 52, and a wiring layer 53. The metal base 51 is a member that is made, for instance, of copper, aluminum, or iron and several hundred micrometers to several millimeters in thickness. The insulating layer 52 is disposed between the metal base 51 and the wiring layer 53 to electrically isolate the metal base 51 from the wiring layer 53. The insulating layer 52 is a thin layer having a thickness of, for example, 100 micrometers. The wiring layer 53 is made, for instance, of copper or aluminum and several ten to several hundred micrometers in thickness.

The resin-sealed discrete MOSFETs 54 and the electrolytic capacitors 314, 324 are reflow-soldered to the wiring layer 53 of the insulated metal circuit board 50. For example, a package approximately 6 mm square is used as the discrete MOSFETs. Unlike conventional electrolytic capacitors, a small-size, high-performance, conductive polymer hybrid electrolytic capacitor is used as the electrolytic capacitors 314, 324.

As shown in FIG. 8, a cutout 55 is formed in a surface of the metal base 51 that is located opposite to a surface on which the wiring layer 53 is disposed. The cutout 55 may be, for example, a V-shaped cut. The power conversion section 310 is divided into the regions 311, 312 with the cutout 55 interposed therebetween. The switching section 10 and the motor semiconductor relay 11 are mounted in the region 311. The electrolytic capacitor 314, the shunt resistor 14, and the power supply semiconductor relay 12 are mounted in the region 312.

The power conversion section 310 has two cooling surfaces located 90 degrees away from each other when bent about a fulcrum formed by the cutout 55 after the parts of the power conversion section 310 are reflow-soldered. The power conversion section 310 may be bent, for example, by pressing it.

A recessed female terminal 341 is disposed in the region 311 of the power conversion section 310. The female terminal 341 is connected to the motor output wiring 209, which is shaped like the two-pronged fork 220 as shown in FIG. 5. As such a configuration is employed, mechanical and electrical connections can be made simultaneously between the power conversion apparatus 300 and the motor 200. The power conversion section 320 will not be redundantly described because it has the same configuration as the power conversion section 310.

As the above-described configuration is employed, it is possible to decrease the size of the power conversion apparatus and increase the reliability thereof even when the insulated metal circuit board and discrete MOSFETs are used. Further, as the circuit parts of the power conversion sections can be mounted by a single reflow process, it is possible to greatly improve productivity.

Fourth Embodiment

Figure 9:
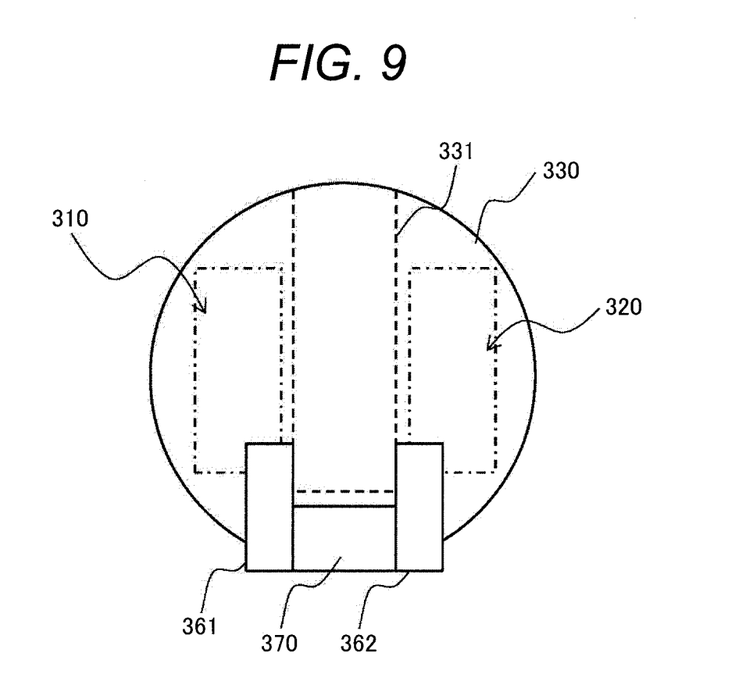
FIG. 9 shows an exemplary arrangement of connectors of the power conversion apparatus according to a fourth embodiment of the present invention.

A fourth embodiment of the present invention will now be described with reference to FIG. 9. FIG. 9 illustrates the arrangement of connectors of the power conversion apparatus 300 according to the fourth embodiment. FIG. 9 shows the cover 330 as viewed from the motor 200. The protrusion 331 is formed in a region that is enclosed by a broken line in the figure.

Power connectors 361, 362 are disposed near a surface parallel to the axial direction of the motor 200 that is a part of the surface of the protrusion 311. The power connectors 361, 362 are in the shape of a male terminal shown in FIG. 5. The power connectors 361, 362 are connected to female terminals disposed on the power conversion sections 310, 320. The female connectors may be disposed in either the region 311 of the power conversion section 310 or the region 312 thereof. The same holds true for the power conversion section 320. The power connectors 361, 362, which are crimped to the female terminals, are screwed down or other secured to the cover 330.

A control connector 370 is disposed between the power connectors 361, 362. The control connector 370 is soldered to the control circuit board 400. The power connectors 361, 362 and the control connector 370 are disposed between the cover 330 and the motor 200.

As described above, the wiring for supplying electrical power to a power conversion section is provided for both the power conversion sections 310, 320. Therefore, even if either one of the power conversion sections 310, 320 becomes faulty, the power conversion apparatus can continuously operate. This makes it possible to provide a power conversion apparatus having higher reliability. Further, as the control connector is disposed between the power connectors, the size of the power conversion apparatus can be reduced.

Fifth Embodiment

Figure 10:
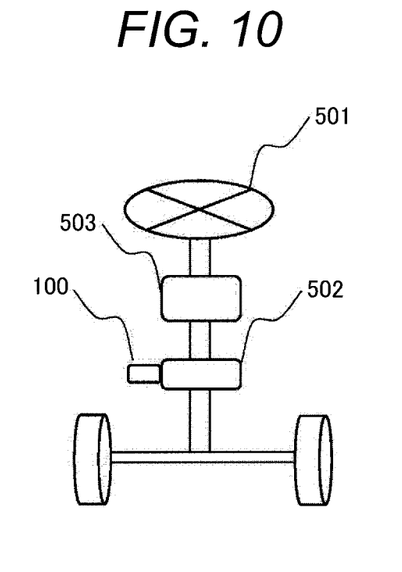
FIG. 10 is a schematic diagram illustrating an electric power steering device according to a fifth embodiment of the present invention.

A fifth embodiment of the present invention will now be described with reference to FIG. 10. FIG. 10 shows an electric power steering device. In the fifth embodiment, the drive unit 100 is configured as described in conjunction with one of the foregoing embodiments. The drive unit 100 transmits torque through a gear 502 installed on a shaft of a steering wheel 501 of a vehicle, and assists the operation of the steering wheel 501. Further, the drive unit 100 also uses torque information derived from a torque sensor attached to the steering wheel 501 and vehicle speed information derived from the vehicle to provide highly responsive, high-performance assistance to the operation of the steering wheel 501.

As described above, when a small-size, highly-reliable drive unit according to the present embodiment is employed for an electric power steering device, the drive unit can be disposed even in a narrow vehicle space. Consequently, the drive unit according to the present embodiment can be applied to various models of vehicle.

Moreover, the drive unit 100 is disposed in such a manner that the protrusion 331 of the power conversion apparatus 300 is positioned upright relative to the ground surface. Therefore, if an electrolytic solution leaks out of an electrolytic capacitor in one power conversion section, the electrolytic solution is inhibited from flowing to the other power conversion section.

In all the foregoing embodiments, the power conversion apparatus 300 includes the motor semiconductor relay 11. However, the motor semiconductor relay 11 may be eliminated if it is possible to avoid the influence of a failure of either one of the power conversion sections.

What is claimed is:

1. A power conversion apparatus comprising:
 a motor that includes a cylindrical motor case, a multi-phase stator disposed in the motor case, and a rotor disposed inside the stator;
 a power conversion section that switches the supply of electrical power to the motor; and
 a cover made of metal on which the power conversion section is mounted, wherein
  the power conversion section includes a first power conversion section and a second power conversion section,
  the cover includes a protrusion that protrudes toward the motor from a surface substantially parallel to the radial direction of the motor,
  the protrusion is formed in such a manner as to separate the first and second power conversion sections from each other,
  the power conversion section includes a first region and a second region,
  the first region of the power conversion section is positioned on a surface of the cover that is substantially parallel to the radial direction of the motor, and
  the second region of the power conversion section is positioned on a surface of the protrusion that is substantially parallel to the axial direction of the motor.

2. The power conversion apparatus according to claim 1, wherein the power conversion section includes a lead frame made of metal, a semiconductor device electrically connected to the lead frame, and resin used to cover the semiconductor device; wherein the lead frame connects the first and second regions of the power conversion section; and wherein a portion of the lead frame that connects the first and second regions is exposed from the resin.

3. The power conversion apparatus according to claim 1, further comprising:
 a control circuit board that is disposed between the cover and the motor;
 wherein the control circuit board includes a first control circuit part for controlling the first power conversion section, a second control circuit part for controlling the second power conversion section, and a common control circuit part for controlling the first and second power conversion sections;
 wherein the first control circuit part is disposed opposite the first power conversion section and along the protruding direction of the protrusion;
 wherein the second control circuit part is disposed opposite the second power conversion section and along the protruding direction of the protrusion; and
 wherein the common control circuit part is disposed opposite the protrusion and along the protruding direction of the protrusion.

4. The power conversion apparatus according to claim 1, wherein the cover includes a heat dissipating fin that is disposed on a surface opposite to the side on which the power conversion section is mounted.

5. The power conversion apparatus according to claim 1, further comprising:
 a metal plate that is disposed in a region opposite the cover with the power conversion section interposed therebetween;
 wherein the metal plate is secured to the cover; and
 wherein one side of the power conversion section is in thermal contact with the cover and the other side of the power conversion section is in thermal contact with the metal plate.

6. The power conversion apparatus according to claim 1, further comprising:
 a control circuit board that is disposed between the cover and the motor;
 wherein the power conversion section includes a capacitor; and
 wherein the capacitor is disposed in a space surrounded by a surface of the cover that is substantially parallel to the radial direction of the motor, by a surface of the protrusion that is substantially parallel to the axial direction of the motor, and by the control circuit board.

7. The power conversion apparatus according to claim 1, wherein the power conversion section mounted on the cover is disposed with respect to the motor from a direction parallel to the axial direction of the motor; wherein the motor includes a wiring that protrudes toward the power conversion section; wherein the power conversion section includes a terminal that is to be connected to the wiring; and wherein the terminal is disposed on a surface of the cover that is substantially parallel to the radial direction of the motor.

8. The power conversion apparatus according to claim 1, wherein the power conversion section includes a metal base, a metal wiring, and a semiconductor device, the metal wiring and the semiconductor device being mounted over the metal base with an insulating material interposed therebetween; and wherein the metal base includes a bend that is located at the joint between the first and second regions.

9. The power conversion apparatus according to claim 8, wherein the bend is formed by bending the metal base about a fulcrum formed by a cutout in the metal base.

10. The power conversion apparatus according to claim 1, wherein the power conversion section includes a connector that inputs and outputs electrical power; wherein the connector includes a first electrical power wiring for inputting electrical power to and outputting electrical power from the first power conversion section and a second electrical power wiring for inputting electrical power to and outputting electrical power from the second power conversion section; and wherein the first electrical power wiring is provided independently of the second electrical power wiring.

11. An electric power steering device comprising:
a speed reducing mechanism;
a motor that is coupled to the speed reducing mechanism; and
a power conversion apparatus that supplies electrical power to the motor;
wherein the power conversion apparatus is as defined by claim 1.

12. A power conversion apparatus comprising:
a motor that includes a cylindrical motor case, a multi-phase stator disposed in the motor case, and a rotor disposed inside the stator;
a power conversion section that switches the supply of electrical power to the motor; and
a cover made of metal on which the power conversion section is mounted;
a control circuit board that is disposed between the cover and the motor, wherein
the power conversion section includes a capacitor, and
the capacitor is disposed in a space surrounded by a surface of the cover that is substantially parallel to the radial direction of the motor, by a surface of the protrusion that is substantially parallel to the axial direction of the motor, and by the control circuit board,
the power conversion section includes a first power conversion section and a second power conversion section,
the cover includes a protrusion that protrudes toward the motor from a surface substantially parallel to the radial direction of the motor, and
the protrusion is formed in such a manner as to separate the first and second power conversion sections from each other.

\* \* \* \* \*